(12) United States Patent
Huang et al.

(10) Patent No.: US 10,217,583 B2
(45) Date of Patent: Feb. 26, 2019

(54) PRESSURE RESPONSIVE SWITCH FOR ACTUATING A DEVICE

(71) Applicant: Halliburton Energy Services, Inc., Houston, TX (US)

(72) Inventors: Wei Hsuan Huang, Singapore (SG); Muhammad Subhan Bin Muhammad Moizuddin, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 19 days.

(21) Appl. No.: 15/513,659

(22) PCT Filed: Oct. 24, 2014

(86) PCT No.: PCT/CA2014/000777
§ 371 (c)(1),
(2) Date: Mar. 23, 2017

(87) PCT Pub. No.: WO2016/061655
PCT Pub. Date: Apr. 28, 2016

(65) Prior Publication Data
US 2017/0256375 A1 Sep. 7, 2017

(51) Int. Cl.
*H01H 35/38* (2006.01)
*G01V 1/52* (2006.01)
*H01H 35/34* (2006.01)
*E21B 41/00* (2006.01)
*E21B 49/00* (2006.01)
(Continued)

(52) U.S. Cl.
CPC ............. *H01H 35/38* (2013.01); *E21B 41/00* (2013.01); *E21B 49/00* (2013.01); *E21B 49/10* (2013.01); *G01V 1/181* (2013.01); *G01V 1/52* (2013.01); *H01H 35/34* (2013.01)

(58) Field of Classification Search
CPC ......... H01H 35/34; H01H 35/38; G01V 1/181
See application file for complete search history.

(56) References Cited

U.S. PATENT DOCUMENTS 3,794,789 A * 2/1974 Bynum ................... F04D 13/16
200/82 R
4,128,248 A 12/1978 Kabelitz et al.
4,262,759 A 4/1981 Young et al.
(Continued)

FOREIGN PATENT DOCUMENTS

CA 2823386 7/2016
EP 0764960 A2 3/1997
(Continued)

*Primary Examiner* — Felix O Figueroa
(74) *Attorney, Agent, or Firm* — Terrence N. Kuharchuk; Parlee McLaws LLP; Craig W. Roddy

(57) ABSTRACT

A switch responsive to a pressure differential, including a pressure response mechanism for providing a pressure response in response to the pressure differential and a device actuator arranged to interact with the pressure response mechanism and to utilize the pressure response of the pressure response mechanism to actuate a device. The device actuator actuates the device to an operative state when the pressure differential is below a lower pressure differential threshold, and may actuate the device to a non-operative state when the pressure differential is above an upper pressure differential threshold.

19 Claims, 7 Drawing Sheets

(51) Int. Cl.
  *E21B 49/10* (2006.01)
  *G01V 1/18* (2006.01)

(56) References Cited

U.S. PATENT DOCUMENTS

| | | |
|---|---|---|
| 4,763,519 A | 8/1988 | Comeau |
| 4,827,095 A | 5/1989 | Clark et al. |
| 5,061,832 A | 10/1991 | Squires |
| 5,167,419 A | 12/1992 | Robertson |
| 5,192,083 A | 3/1993 | Jones, Jr. et al. |
| 5,199,718 A | 4/1993 | Niemiec |
| 5,238,070 A | 8/1993 | Schultz et al. |
| 5,243,158 A * | 9/1993 | Zimmermann ............ F16J 3/02 200/302.1 |
| 5,279,363 A | 1/1994 | Schultz et al. |
| 5,602,373 A | 2/1997 | Sauer et al. |
| 5,693,926 A | 12/1997 | Cassidy |
| 6,158,533 A | 12/2000 | Gillis et al. |
| 6,802,380 B2 | 10/2004 | Blackman |
| 7,083,170 B2 | 8/2006 | Borstel et al. |
| 7,563,161 B2 | 7/2009 | Perret |
| 8,413,994 B2 | 4/2013 | Jordan |
| 2004/0020657 A1 | 2/2004 | Patel |
| 2009/0108542 A1 | 4/2009 | Jordan |
| 2009/0133930 A1 | 5/2009 | Thorp et al. |
| 2010/0314957 A1 | 12/2010 | Wellman |
| 2012/0251044 A1 | 10/2012 | Zhang et al. |
| 2013/0048274 A1 | 2/2013 | Schultz et al. |
| 2013/0118761 A1 | 5/2013 | Ludwig |
| 2013/0175095 A1 | 7/2013 | Dewey et al. |
| 2014/0035238 A1 | 2/2014 | Richie et al. |
| 2014/0151065 A1 | 6/2014 | Stephenson et al. |
| 2014/0262211 A1 | 9/2014 | Xu et al. |

FOREIGN PATENT DOCUMENTS

| | | |
|---|---|---|
| EP | 0875659 A2 | 11/1998 |
| EP | 0884483 B1 | 8/2003 |
| EP | 2594829 A1 | 5/2013 |
| EP | 2495467 B1 | 12/2014 |
| WO | 1986005543 | 9/1986 |
| WO | 1991019120 | 12/1991 |
| WO | 1998039547 | 9/1998 |
| WO | 2014123549 A1 | 8/2014 |

* cited by examiner

PRESSURE RESPONSIVE SWITCH FOR ACTUATING A DEVICE

TECHNICAL FIELD

A pressure responsive switch for actuating a device in response to a pressure differential acting on the switch.

BACKGROUND OF THE INVENTION

A switch may be used to actuate a device. A pressure responsive switch may be responsive to a pressure differential acting on the switch.

BRIEF DESCRIPTION OF DRAWINGS

Embodiments of the invention will now be described with reference to the accompanying drawings, in which.

DETAILED DESCRIPTION

Figure 1:
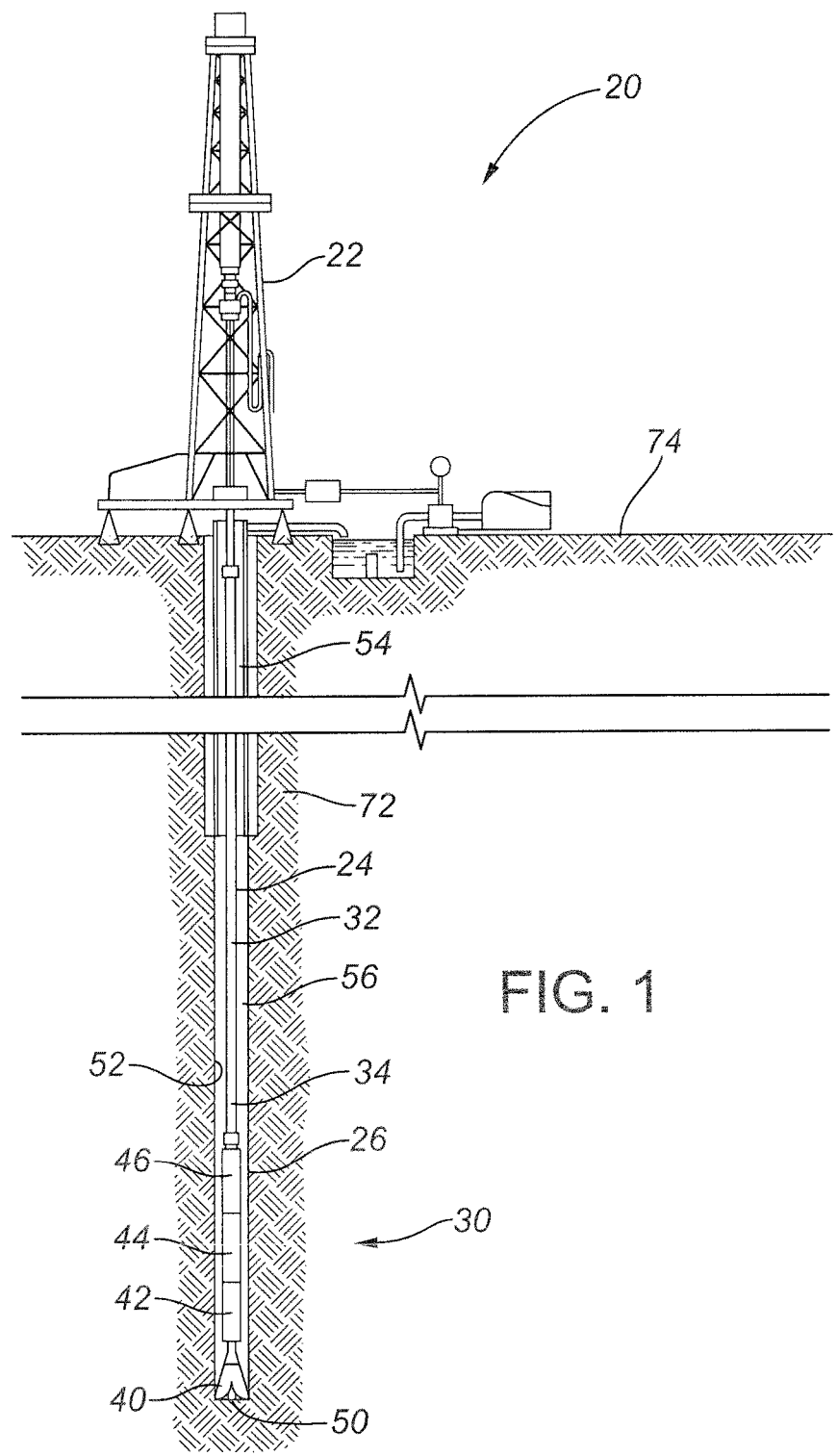
FIG. 1 is a schematic drawing of a drilling system for drilling a borehole.

References in this document to orientations, to operative parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at a switch which is responsive to a pressure differential acting on the switch, at various apparatus comprising the switch, and at methods of actuating a device in response to a pressure differential.

The switch may be used in any apparatus in which it is desired to actuate a device, and where a pressure differential is available to operate the switch.

In some embodiments, the apparatus in which the switch is used may be configured to be insertable within a borehole during the drilling, completion, servicing, testing and/or use of the borehole. The apparatus in which the switch is used may be inserted into a borehole in any suitable manner, including but not limited to, via a pipe string, a coiled tubing, a wireline, or a slickline.

In some particular embodiments, the apparatus in which the switch is used may be an apparatus for use in drilling a borehole. In some particular embodiments, the apparatus in which the switch is used may be a component of a bottom hole assembly for use in drilling a borehole.

The switch comprises a pressure response mechanism and a device actuator.

A function of the pressure response mechanism is to provide a pressure response for the switch in response to a pressure differential acting on the pressure response mechanism.

As used herein, the "pressure differential" is the difference between a first pressure acting on the pressure response mechanism and a second pressure acting on the pressure response mechanism, such that the pressure differential is equal to the first pressure minus the second pressure. If the first pressure is greater than the second pressure, the pressure differential is a positive pressure differential. If the first pressure is less than the second pressure, the pressure differential is a negative pressure differential. A negative pressure differential is considered to be lower than a positive pressure differential. A pressure differential is considered to increase as it becomes more positive or less negative. A pressure differential is considered to decrease as it becomes less positive or more negative.

A function of the device actuator is to interact with the pressure response mechanism to utilize the pressure response to actuate one or more devices and/or one or more components of a single device.

The pressure response mechanism may comprise any suitable structure, device or apparatus which is capable of providing a pressure response in response to a pressure differential which can be utilized by a device actuator.

The pressure response may comprise any reaction to a pressure differential which is capable of being used by a device actuator to actuate a device. As non-limiting examples, the pressure response may be a physical movement or an electric, magnetic, pneumatic and/or hydraulic signal.

In some embodiments, the pressure response of the pressure response mechanism may comprise a range of response positions of the pressure response mechanism. In some embodiments, a first pressure response position of the pressure response mechanism and a second pressure response position of the pressure response mechanism may be included within the range of response positions.

In some embodiments, the pressure response mechanism may be in the first pressure response position if the pressure differential acting on the pressure response mechanism is below a lower pressure differential threshold.

In some embodiments, the pressure response mechanism may be in the first pressure response position if the pressure differential acting on the pressure response mechanism is above an upper pressure differential threshold.

In some embodiments, the pressure response mechanism may be in the second pressure response position if the pressure differential acting on the pressure response mechanism is below a lower pressure differential threshold.

In some embodiments, the pressure response mechanism may be in the second pressure response position if the pressure differential acting on the pressure response mechanism is above an upper pressure differential threshold.

In some embodiments, the pressure response mechanism may be in an intermediate pressure response position if the pressure differential acting on the pressure response mechanism is between the lower pressure differential threshold and the upper pressure differential threshold.

In some embodiments, the pressure response mechanism may comprise a switch piston and a switch cylinder.

In embodiments in which the pressure response mechanism comprises a switch piston and a switch cylinder, the switch piston may be contained within the switch cylinder so that the switch piston divides the switch cylinder into a first switch chamber and a second switch chamber, wherein the first switch chamber is adjacent to a first switch cylinder end of the switch cylinder, and wherein the second switch chamber is adjacent to a second switch cylinder end of the switch cylinder.

In embodiments in which the pressure response mechanism comprises a switch piston and a switch cylinder, the first switch chamber is in pressure communication with one of the first pressure and the second pressure, and the second switch chamber is in pressure communication with the other of the first pressure and the second pressure. In some embodiments, the first switch chamber may be in pressure communication with the first pressure and the second switch chamber may be in pressure communication with the second switch chamber.

In embodiments in which the pressure response mechanism comprises a switch piston and a switch cylinder, the switch cylinder and the switch piston are reciprocable relative to each other in response to a pressure differential between the first switch chamber and the second switch chamber, thereby providing a pressure response. In some such embodiments, the piston may be fixed and the switch cylinder may be reciprocable. In some such embodiments, the switch cylinder may be fixed and the piston may be reciprocable. In some such embodiments, both the piston and the switch cylinder may be reciprocable.

In embodiments in which the pressure response mechanism comprises a switch piston and a switch cylinder, the first pressure response position and the second pressure response position may be defined by the position of the switch piston relative to the switch cylinder.

The switch cylinder and the switch piston may comprise any suitable structures, devices or apparatus which are compatible with each other and which are reciprocable relative to each other in response to a pressure differential between the first switch chamber and the second switch chamber in order to provide a pressure response for the switch.

As a first non-limiting example, in some embodiments, the switch cylinder may comprise a tubular structure. As a second non-limiting example, in some embodiments, the switch cylinder may comprise a cavity defined in an apparatus or in a component of an apparatus.

In some embodiments, a seal may be provided between the switch piston and the switch cylinder, for inhibiting fluids and/or pressure from passing between the first switch chamber and the second switch chamber. The seal may comprise any number of suitable seal elements, which may be configured in any suitable manner. In some embodiments, the seal may comprise a first seal element mounted on the switch piston adjacent to the first switch chamber and a second seal element mounted on the switch piston adjacent to the second switch chamber.

The device actuator may comprise any suitable structure, device or apparatus which is capable of interacting with the pressure response mechanism in order to utilize a pressure response provided by the pressure response mechanism to actuate a device. As non-limiting examples, the device actuator may be a mechanical, electrical, magnetic, pneumatic, and/or hydraulic actuator.

The device actuator may interact with the pressure response mechanism in any suitable manner. As a non-limiting example, the device actuator may be directly or indirectly connected with the pressure response mechanism in a manner which enables the device actuator to utilize the pressure response of the pressure response mechanism to actuate a device.

In embodiments in which the device actuator is connected with the pressure response mechanism, the device actuator may be connected with the pressure response mechanism in any suitable manner which enables the device actuator to utilize the pressure response of the pressure response mechanism to actuate a device. As non-limiting examples, the device actuator may be mechanically, electrically, magnetically, pneumatically and/or hydraulically connected, directly or indirectly, with the pressure response mechanism. As a further non-limiting example, the device actuator may be connected with the pressure response mechanism by being integrally formed with a component of the pressure response mechanism.

The device actuator is movable between a first actuator position and a second actuator position as a result of the pressure response of the pressure response mechanism. The first actuator position of the device actuator may coincide with the first pressure response position of the pressure response mechanism. The second actuator position of the device actuator may coincide with the second pressure response position of the pressure response mechanism. In some embodiments, one or more intermediate actuator positions between the first actuator position and the second actuator position may coincide with one or more intermediate pressure response positions of the pressure response mechanism.

In embodiments in which the pressure response mechanism comprises a switch piston and a switch cylinder, the device actuator may interact with one or both of the switch piston and the switch cylinder. For example, in some embodiments the device actuator may interact with the switch piston if the switch piston is reciprocable. For example, in some embodiments the device actuator may interact with the switch cylinder if the switch cylinder is reciprocable. In some embodiments, the device actuator may interact with both the switch piston and the switch cylinder if both the switch piston and the switch cylinder are reciprocable.

In embodiments in which the pressure response mechanism comprises a switch piston which reciprocates relative to the switch cylinder, the device actuator may interact with the switch piston. The device actuator may interact with the switch piston in any suitable manner.

In some particular embodiments, the device actuator may be connected with the switch piston directly, indirectly, or by being integrally formed with the switch piston. In such embodiments, the switch cylinder may accommodate the device actuator in any suitable manner to enable the device actuator to reciprocate with the switch piston relative to the switch cylinder.

In some such embodiments, the switch cylinder may define a device actuator groove for accommodating the device actuator. In some such embodiments, the pressure response mechanism may be configured so that the device actuator groove is maintained between seal elements provided between the switch piston and the switch cylinder as the switch piston reciprocates relative to the switch cylinder.

The device actuator is configured to interact with at least one device in order to actuate the device. The device may comprise any structure, device or apparatus which is capable of being actuated by the device actuator.

The device actuator may interact with a device in any suitable manner. As a non-limiting example, the device actuator may be directly or indirectly connected with a device in a manner which enables the device actuator to actuate the device utilizing the pressure response of the pressure response mechanism.

In some embodiments, the device actuator may be operably connected with a device such that the device is actuated between two or more device states as the device actuator moves between the first actuator position and the second actuator position. In such embodiments, the device actuator may be operably connected with the device in any suitable manner which enables the device actuator to utilize the pressure response of the pressure response mechanism to actuate the device. As a non-limiting example, the device actuator may be connected with the device by being integrally formed with the device. As other non-limiting examples, the device actuator may be mechanically, electrically, magnetically, pneumatically and/or hydraulically connected with the device.

In some embodiments, the device actuator may actuate a device between an operative state and a non-operative state. In some embodiments, the device actuator may actuate a device to an operative state when the device actuator is in the first actuator position. In some embodiments, the device actuator may actuate a device to an operative state when the device actuator is in the second actuator position.

In some particular embodiments, the device actuator may comprise a mechanical linkage between the pressure response mechanism and a device. The mechanical linkage may comprise any suitable mechanical structure, device or apparatus which is capable of utilizing the pressure response of the pressure response mechanism to actuate the device. In some embodiments, the mechanical linkage may comprise a single member. In some embodiments, the mechanical linkage may comprise a plurality of members.

In some embodiments, the switch may comprise a single device actuator connected between the pressure response mechanism and one or more devices. In some embodiments, the switch may comprise a plurality of device actuators connected between the pressure response mechanism and one or more devices.

As a first non-limiting example, the device actuator may comprise a first device actuator and a second device actuator. The first device actuator and the second device actuator may actuate separate devices, or may actuate different components of a single device. As a second non-limiting example, the device actuator may comprise a single device actuator. The single device actuator may actuate a plurality of devices, or may actuate a plurality of components of a single device.

In some embodiments, the switch may comprise a biasing device for urging the pressure response mechanism toward the first pressure response position or the second pressure response position. The biasing device may comprise any suitable structure, device or apparatus which is capable of biasing the pressure response mechanism toward the desired pressure response position.

In some embodiments in which the pressure response mechanism comprises a switch piston and a switch cylinder, the biasing device may comprise a spring. In some embodiments, the spring may be contained within either the first switch chamber or the second switch chamber. In some particular embodiments, the spring may be contained within the second switch chamber in order to urge the switch piston toward the first switch cylinder end and the first pressure response position.

In some embodiments, the switch may be a component of an apparatus or may be otherwise associated with an apparatus. In such embodiments, the apparatus may comprise the switch and one or more devices to be actuated by the switch. In some embodiments, the switch and the one or more devices may be contained in separate apparatus.

The apparatus may be any structure, device or apparatus which may be exposed to a first pressure and a second pressure, and/or a pressure differential.

In some embodiments, the apparatus may define an interior space and may have an exterior. In such embodiments, the first pressure may be a pressure at one of the interior space and the exterior of the apparatus and the second pressure may be a pressure at the other of the interior space and the exterior of the apparatus. In some particular embodiments, the first pressure may be a pressure in the interior space and the second pressure may be a pressure at the exterior of the apparatus.

In some embodiments, the apparatus may define a bore. The bore may extend fully or partially through an interior of the apparatus. In some such embodiments, the first pressure may be a pressure in the bore of the apparatus and the second pressure may be a pressure at the exterior of the apparatus. In some particular embodiments, the apparatus may be contained in a pipe string and/or may be a component of the pipe string.

In some embodiments, the apparatus may be insertable in a borehole. In some such embodiments, the apparatus may be contained in a pipe string and/or may be a component of a pipe string which is insertable in the borehole. In some particular embodiments, the pipe string may comprise a drill string for use in drilling the borehole.

In some embodiments in which the pressure response mechanism comprises a switch piston and a switch cylinder, the switch may comprise one or more fluid isolation systems for isolating the switch cylinder from fluids which are the sources of the first pressure and the second pressure.

In some embodiments, the switch may comprise a first fluid isolation system for isolating the first switch chamber from a first fluid. In some embodiments, the first fluid may be an interior space fluid contained in an interior space of the apparatus. In some embodiments, the first fluid isolation system may be located between the interior space of the apparatus and the first switch chamber so that the first fluid isolation system isolates the first switch chamber from the interior space fluid.

In some embodiments, the first fluid isolation system may comprise a first flexible fluid barrier between the interior space and the first switch chamber and a first pressure transmission chamber between the first flexible fluid barrier and the first switch chamber. The first flexible fluid barrier may comprise any suitable structure, device or apparatus which is capable of isolating the first switch chamber from the interior space fluid while communicating pressure from the interior space to the first switch chamber. In some embodiments, the first flexible fluid barrier may comprise a diaphragm. The diaphragm may be constructed of any suitable material.

In some embodiments, a first pressure transmission fluid may be contained within the first pressure transmission chamber and the first switch chamber. The first pressure transmission fluid may comprise any suitable fluid. In some embodiments, the first pressure transmission fluid may comprise or consist essentially of a suitable oil or similar liquid.

In some embodiments, the switch may comprise a second fluid isolation system for isolating the second switch chamber from a second fluid. In some embodiments, the second fluid may be an exterior fluid located at the exterior space of the apparatus. In some embodiments, the second fluid isolation system may be located between the exterior of the apparatus and the second switch chamber so that the second fluid isolation system isolates the second switch chamber from the exterior fluid.

In some embodiments, the second fluid isolation system may comprise a second flexible fluid barrier between the exterior of the apparatus and the second switch chamber and a second pressure transmission chamber between the second flexible fluid barrier and the second switch chamber. The second flexible fluid barrier may comprise any suitable structure, device or apparatus which is capable of isolating the second switch chamber from the exterior fluid while communicating pressure from the of the apparatus to the second switch chamber. In some embodiments, the second flexible fluid barrier may comprise a diaphragm. The diaphragm may be constructed of any suitable material.

In some embodiments, a second pressure transmission fluid may be contained within the second pressure transmission chamber and the second switch chamber. The second pressure transmission fluid may comprise any suitable fluid. In some embodiments, the second pressure transmission fluid may comprise or consist essentially of a suitable oil or similar liquid.

In some embodiments, the device and the switch may be components of a single apparatus. In some embodiments, the switch and the device may be contained in separate apparatus. In some embodiments, an apparatus may comprise a plurality of switches and/or a plurality of devices. In some embodiments, a plurality of apparatus may comprise a plurality of switches and/or a plurality of devices.

In embodiments in which the apparatus is insertable in a borehole, a device may comprise any suitable device which may require actuation in the borehole, and which can be actuated by the switch.

In some particular embodiments in which the apparatus is insertable in a borehole, the device may be a geophone device comprising a geophone sensor. The geophone sensor may comprise any geophone sensor which is suitable for use in a borehole.

In some such embodiments, the geophone device may further comprise a geophone lock associated with the geophone sensor. A function of the geophone lock is to immobilize the geophone sensor when the geophone device is not in use, thereby reducing the likelihood of damage to the geophone sensor. The geophone lock may comprise any structure, device or apparatus which is actuatable to immobilize and mobilize the geophone sensor.

In some such embodiments, the geophone device may further comprise a borehole coupler. A function of the borehole coupler is to provide a physical connection between the geophone device and the borehole when the geophone device is in use, thereby improving the transmission of seismic signals from the borehole to the geophone sensor. The borehole coupler may comprise any structure, device or apparatus which is actuatable to engage with or disengage from the borehole. In some embodiments, the borehole coupler may comprise one or more coupling arms which are extendable and retractable to engage with or disengage from the borehole. In some particular embodiments, the borehole coupler may comprise any number of coupling arms arranged around the circumference of the apparatus.

In embodiments in which the device is a geophone device comprising a geophone lock and a borehole coupler, the geophone device may be actuated by the switch to an operative state in which the geophone lock mobilizes the geophone sensor and the borehole coupler is engaged with the borehole, and may be actuated by the switch to a non-operative state in which the geophone lock immobilizes the geophone sensor and the borehole coupler is disengaged from the borehole.

In embodiments in which the device is a geophone device comprising a geophone lock and a borehole coupler, the geophone device may be actuated by a single switch or by a plurality of switches.

In some such embodiments, the geophone may be actuated by a single switch, and the device actuator may comprise a first device actuator for actuating the geophone lock and a second device actuator for actuating the borehole coupler. In some particular embodiments, the first device actuator may comprise a mechanical linkage including one or more members integrally formed or otherwise connected with the switch piston, and the second device actuator may comprise a separate mechanical linkage including one or more members integrally formed or otherwise connected with the switch piston.

In some such embodiments, the geophone may be actuated by a single switch and the device actuator may comprise a single device actuator for actuating both the geophone lock and the borehole coupler. In some such embodiments, the single device actuator may comprise a mechanical linkage including one or more members integrally formed or otherwise connected with the switch piston.

In some particular embodiments in which the apparatus is insertable in a borehole, the device may be a sampling device. The sampling device may comprise any sampling device which is suitable for use in a borehole. The sampling device may comprise any number of components, any of which may be actuated by the switch. In some embodiments, the sampling device may comprise a sampling tube which may be actuated by the switch to an operative state in which the sampling tube is extended into engagement with the borehole to collect a sample and which may be actuated by the switch to a non-operative state in which the sampling tube is retracted from the borehole to protect the sample and the sampling device.

A method for actuating a device using a switch which utilizes a pressure differential may comprise providing a pressure response mechanism, providing a device actuator, and providing a pressure differential to actuate the device. In some embodiments, providing the pressure differential may comprise providing a first pressure differential which is below a lower pressure differential threshold in order to actuate the device to a first state. In some embodiments, providing the pressure differential may comprise providing a second pressure differential which is above an upper pressure differential threshold in order to actuate the device to a second state. In some embodiments, the first state may be an operative state and the second state may be a non-operative state.

Exemplary, non-limiting embodiments of switches, apparatus, devices and methods are now described with reference to FIGS. 1-11.

Figures 2A, 2B:
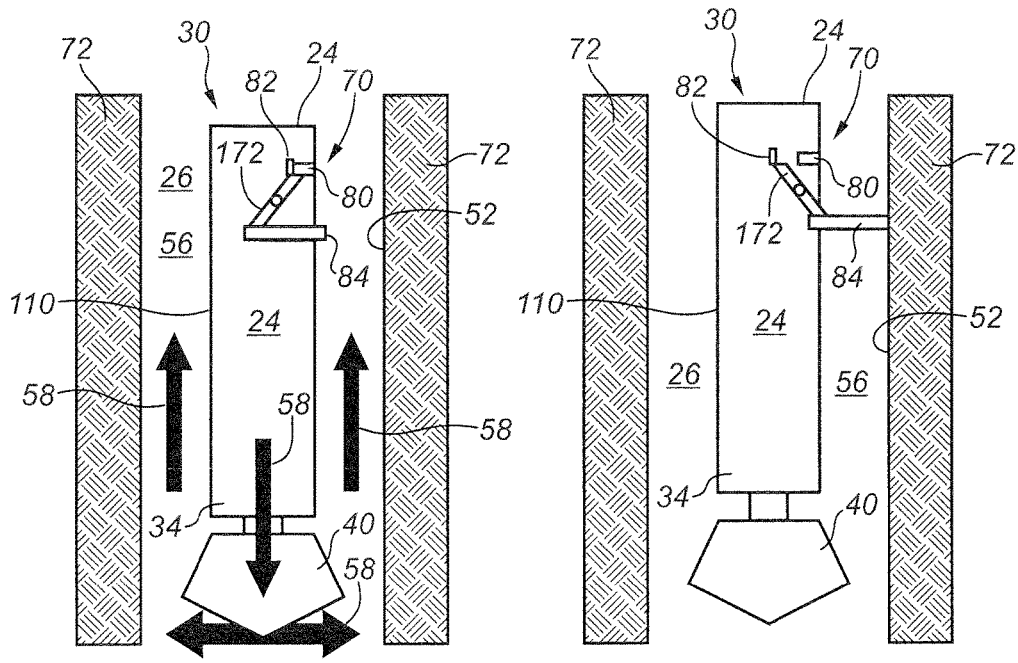
FIGS. 2A and 2B are schematic side views depicting the operation of an exemplary switch configuration for actuating a device between a non-operative state and an operative state respectively in response to a pressure differential acting on the switch, wherein the device is a geophone device.
Figures 3A, 3B:
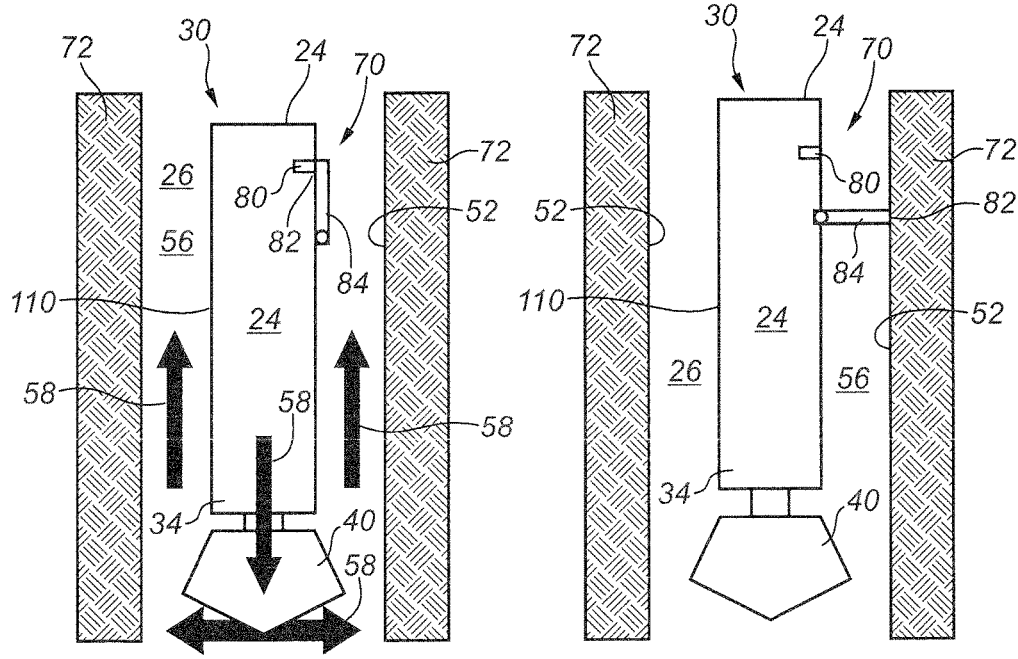
FIGS. 3A and 3B are schematic side views of a device in a non-operative state and an operative state respectively, wherein the device is an alternate configuration of a geophone device.
Figure 4A:
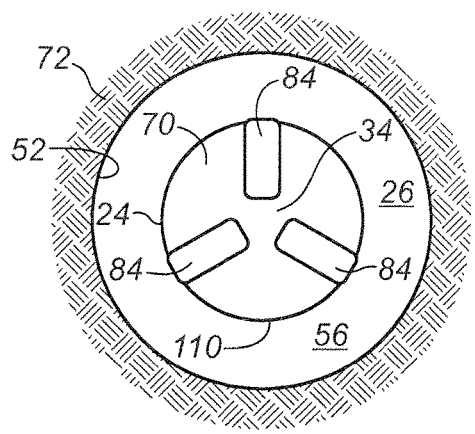
FIGS. 4A and 4B are schematic top views of a drill string depicting a borehole coupler in a geophone device in a non-operative state and an operative state respectively.
Figure 4B:
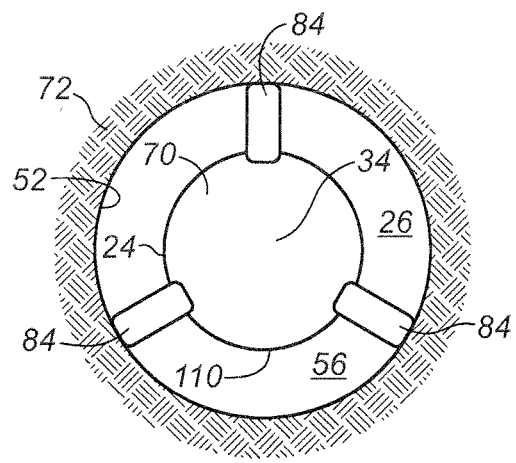
Figure 5:
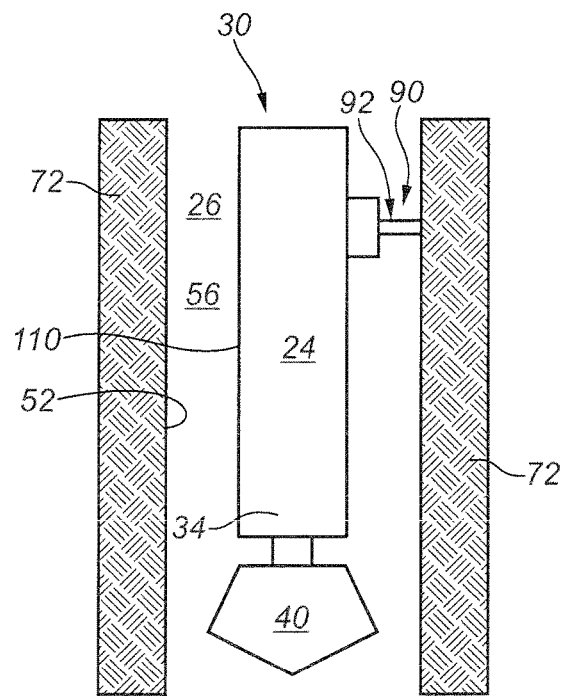
FIG. 5 is a schematic side view of a device in an operative state, wherein the device is a sampling device.
Figure 6:
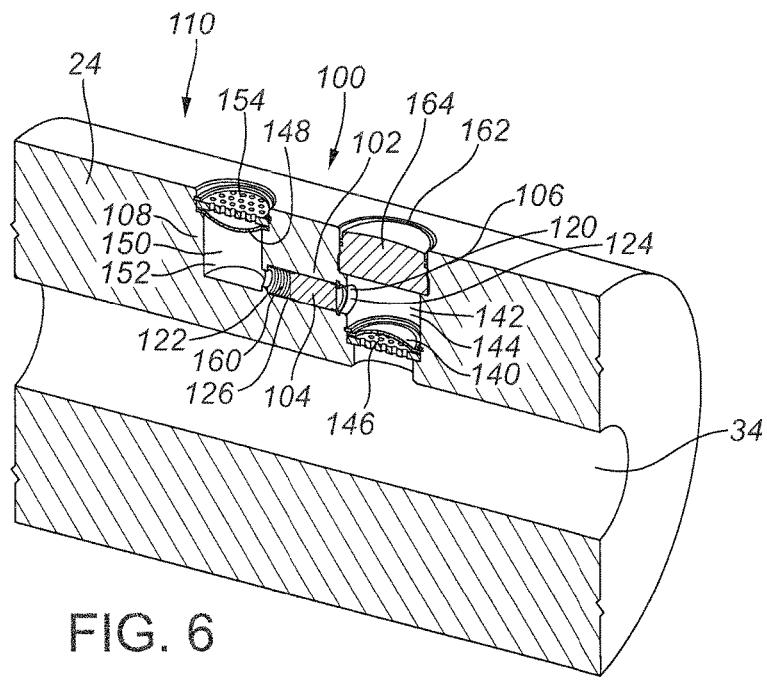
FIG. 6 is a cutaway pictorial view of a first exemplary embodiment of a pressure response mechanism in a switch.
Figure 7:
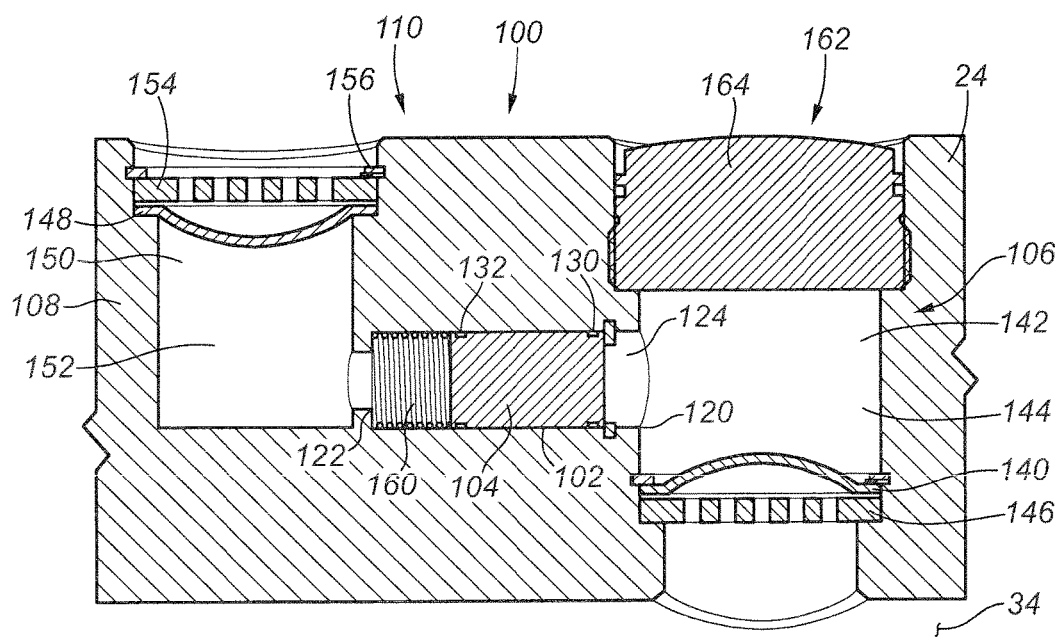
FIG. 7 is a cutaway side view of the pressure response mechanism depicted in FIG. 6.
Figure 8:
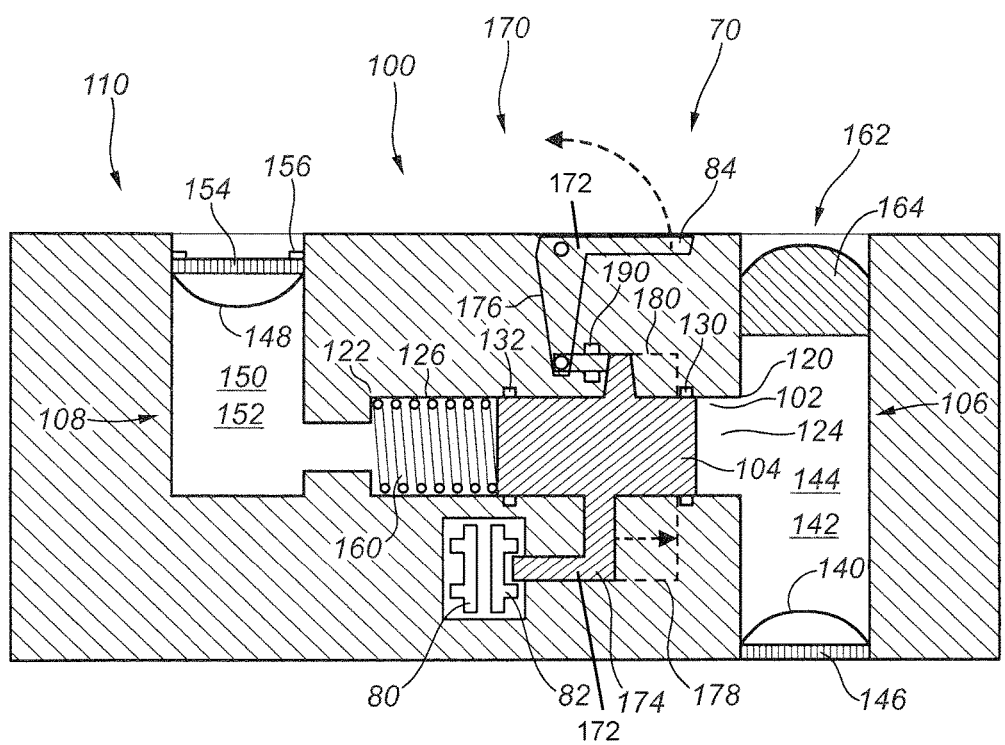
FIG. 8 is a schematic side view of a first exemplary embodiment of a switch, including the pressure response mechanism depicted in FIG. 6 and two device actuators configured to actuate components of a geophone device.
Figure 9:
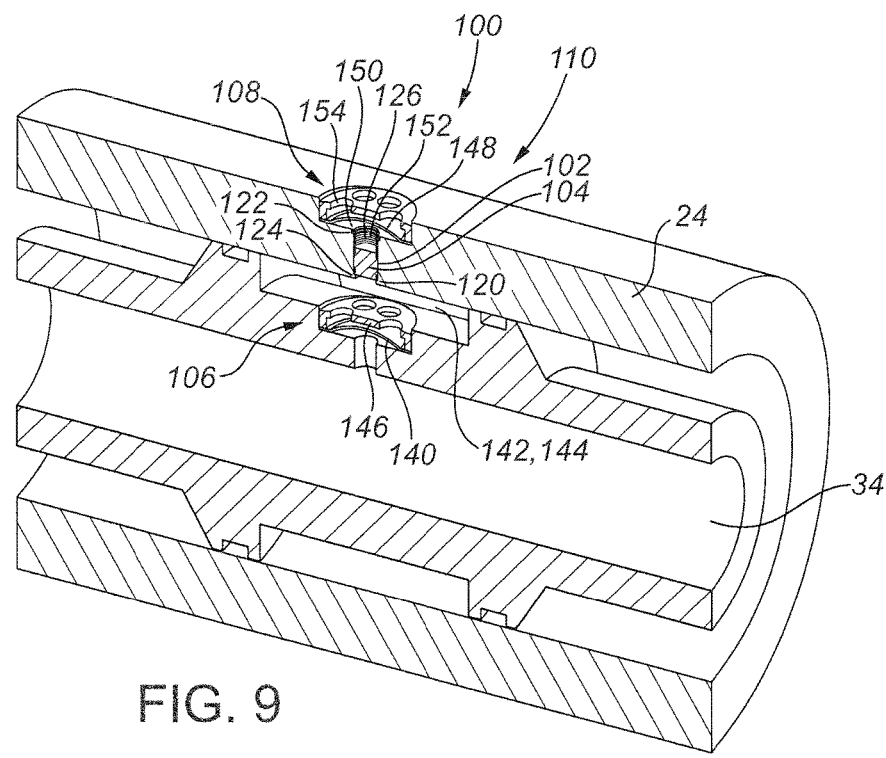
FIG. 9 is a cutaway pictorial view of a second exemplary embodiment of a pressure response mechanism in a switch.
Figure 10:
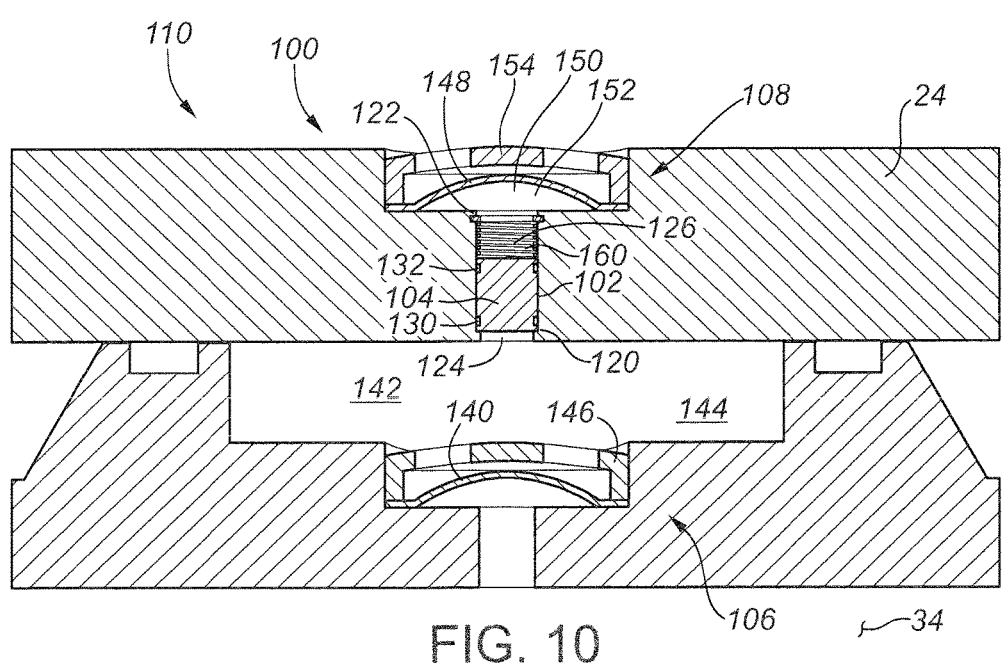
FIG. 10 is a cutaway side view of the pressure response mechanism depicted in FIG. 9.
Figure 11:
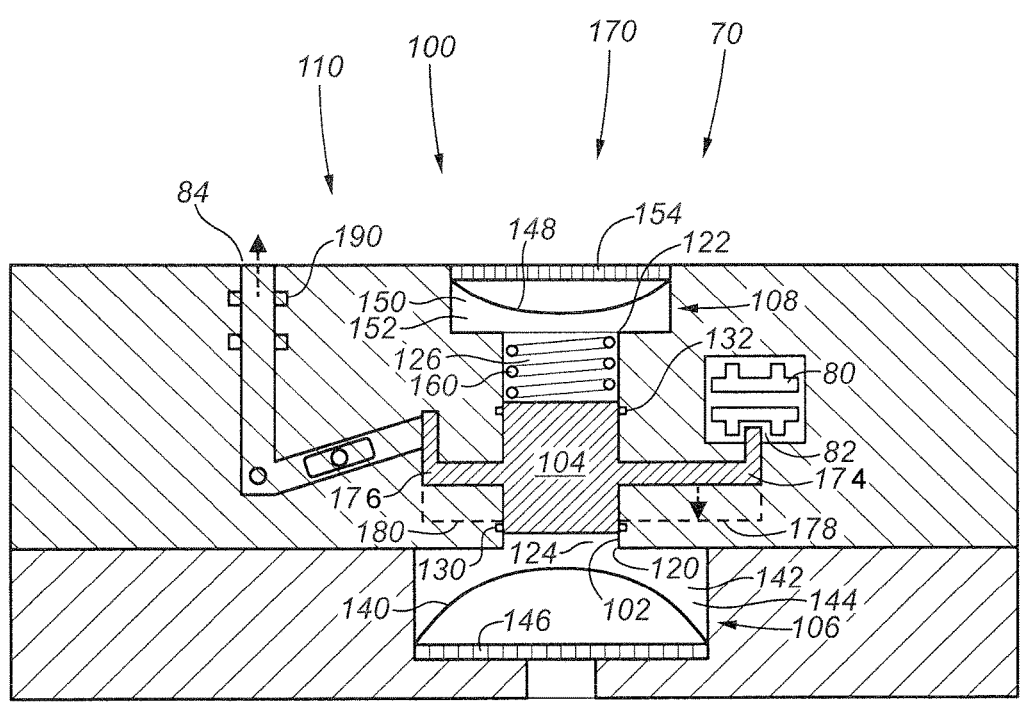
FIG. 11 is a schematic side view of a second exemplary embodiment of a switch, including the pressure response mechanism depicted in FIG. 9 and two device actuators configured to actuate components of a geophone device.

FIG. 1 depicts an exemplary drilling system (20) of the type which may utilize one or more switches to actuate a device. FIGS. 2A and 2B depict schematically the operation of a switch configuration for actuating a geophone device between a non-operative state and an operative state respectively. FIGS. 3A and 3B depict schematically an alternate configuration of a geophone device in a non-operative state and an operative state respectively. FIGS. 4A and 4B depict schematically a borehole coupler in a geophone device schematically in a non-operative state and an operative state respectively. FIG. 5 depicts schematically a sampling device in an operative state. FIGS. 6-7 depict a first exemplary embodiment of a pressure response mechanism in a switch. FIG. 8 depicts a first exemplary embodiment of a switch, including the pressure response mechanism of FIGS. 6-7 and two device actuators configured to actuate components of a geophone device. FIGS. 9-10 depict a second exemplary embodiment of a pressure response mechanism in a switch. FIG. 11 depicts a second exemplary embodiment of a switch, including the pressure response mechanism of FIGS. 9-10 and two device actuators configured to actuate components of a geophone device.

FIGS. 1-11 are exemplary only. The switch may be used in any suitable apparatus and at any suitable location in any suitable apparatus, and the switch may be utilized in embodiments other than the specific embodiments depicted in FIGS. 1-11.

Referring to FIG. 1, the exemplary drilling system (20) comprises a drilling rig (22) and a drill string (24), which may be used to drill a borehole (26).

In the exemplary drilling system (20) depicted in FIG. 1, the drill string (24) comprises a bottom hole assembly (30) at a distal end of the drill string (24) and drill pipe (32) extending from the bottom hole assembly (30) to the drilling rig (22). A bore (34) extends through the drill string (24).

The bottom hole assembly (30) as depicted in FIG. 1 may comprise a drill bit (40), a rotary steerable drilling device (42), a drilling motor (44) and a measurement-while-drilling (MWD) module (46).

One or more components may be added to, omitted from and/or substituted in other drilling systems which may be suitable for use with the switch. As non-limiting examples, the rotary steerable drilling device (42) and/or the drilling motor (44) may be omitted from the drill string (24).

In addition, the drilling system (20) depicted in FIG. 1 may be substituted with some other system for use in the borehole (26). As non-limiting examples, the drill rig (22) may be substituted with a coiled tubing rig (not shown), a service rig (not shown) or a wellhead (not shown), and the drill pipe (32) may be substituted with a coiled tubing (not shown), a tubing (not shown), a wireline (not shown), or a slickline (not shown).

The borehole (26) has a borehole bottom (50) and a borehole sidewall (52). A proximal end of the borehole (26) may be lined with a surface casing (54). A borehole annulus (56) is defined between the borehole sidewall (50) and the drill string (24).

During drilling of the borehole (26), drilling fluid (58) is typically pumped downward into the borehole (26) from the ground surface through the bore (34) of the drill string (24) so that it exits the drill string (24) at the drill bit (40) and returns to the ground surface through the borehole annulus (56). The circulating drilling fluid (58) lubricates and cools the drill bit (40) and removes cuttings and other debris from the borehole (26).

In addition, during drilling of the borehole (26), the drill bit (40) is typically rotated by the drilling motor (44) and/or by rotating the drill string (26).

The drill string (24) may further include one or more devices which may be used to assist in drilling the borehole (26). As non-limiting examples, such devices may include tools and sensors in the measurement-while-drilling (MWD) module (46), tools and sensors in a logging-while-drilling (LWD) module (not shown), tools and sensors in a seismic-while-drilling (SWD) module (not shown), and other tools, sensors, sampling apparatus, testing apparatus etc. Such devices may be located in the measurement-while-drilling module (46) or at any other position within the drill string (24).

Referring to FIGS. 2A-2B and FIGS. 3A-3B, a geophone device (70) may be included in the drill string (24), either as a component of the measurement-while-drilling module (46), as a component of a seismic-while-drilling (SWD) module, as a component of a logging-while-drilling (LWD) module, or at some other location and/or in some other manner.

The purpose of the geophone device (70) is to detect seismic energy propagating through the ground (72) surrounding the borehole (26) from a seismic source (not shown) located at the ground surface (74). The seismic source typically produces relatively low frequency seismic energy due to the low attenuation rate of low frequency seismic energy.

The geophone device (70) typically has a relatively low resonance frequency to match the frequency of the seismic source. A low resonance frequency geophone device (70) must be relatively sensitive in order to detect low frequencies, and is thus somewhat susceptible to damage due to vibration and shock during drilling of the borehole (26). As a result, it would be desirable to protect the geophone device (70) from such damage. In addition, in order to achieve good signal quality from the geophone device (70), it would be desirable to facilitate good physical coupling between the geophone device (70) and the surrounding borehole (26), thereby improving the transmission of seismic signals from the borehole (26) to the geophone device (70).

In order to use the geophone device (70) in the drill string (24) to detect seismic energy for checkshot measurements and/or for vertical-seismic-profiling (VSP), it is first typically necessary to cease circulating drilling fluid (58) through the drill string (24) and to cease drilling by stopping the rotation of the drill bit (40).

FIGS. 2A and 3A depict schematically a desired non-operative state of the geophone device (70) within the drill string (24) during drilling, while FIGS. 2B and 3B depict schematically a desired operative state of the geophone device (70) within the drill string (24) during use of the geophone device (70) to detect seismic energy.

The geophone device (70) as depicted in FIGS. 2A-2B and FIGS. 3A-3B comprises a geophone sensor (80), a geophone lock (82) and a borehole coupler (84).

The geophone lock (82) is actuatable between an operative state in which the geophone sensor (80) is mobilized and is capable of sensing seismic energy and a non-operative state in which the geophone sensor (80) is immobilized and is not capable of sensing seismic energy, but protected from vibration and shock.

Referring to FIGS. 4A and 4B, the borehole coupler (84) is actuatable between an operative state (FIG. 4A) in which the borehole coupler (84) extends from the drill string (24) and engages the borehole sidewall (52) to improve the transmission of seismic energy from the borehole (26) to the geophone sensor (80) and a non-operative state (FIG. 4B) in which the borehole coupler (84) is disengaged from the borehole sidewall (52) and is retracted away from the borehole sidewall (52) in order to protect the borehole coupler (84). The borehole coupler (84) may comprise a single extendable and retractable coupling arm or a plurality of extendable and retractable coupling arms arranged around the circumference of the drill string (24). As depicted schematically in FIGS. 4A and 4B, the borehole coupler (84) comprises three extendable and retractable coupling arms arranged around the circumference of the drill string (24).

Referring to FIG. 5, a sampling device (90) may be included in the drill string (24), either as a component of the measurement-while-drilling module (46), as a component of a seismic-while-drilling (SWD) module, as a component of a logging-while-drilling (LWD) module, or at some other location and/or in some other manner.

As depicted schematically in FIG. 5, the sampling device (90) comprises a sampling tube (92) and is actuatable between an operative state in which the sampling tube (92) extends from the drill string (24) and engages the borehole sidewall (52) in order to collect a sample (not shown) and a non-operative state in which the sampling tube (92) is disengaged from the borehole sidewall (52) and is retracted away from the borehole sidewall (52) in order to protect the sampling tube (92).

The geophone device (70) and the sampling device (90) are non-limiting examples of devices which may be included in the drill string (24) and which may be actuated by a pressure responsive switch.

FIGS. 6-7 depict a first exemplary embodiment of a pressure response mechanism in a switch. FIG. 8 depicts a first exemplary embodiment of a switch which includes the first exemplary embodiment of the pressure response mechanism depicted in FIGS. 6-7. FIGS. 9-10 depict a second exemplary embodiment of a pressure response mechanism in a switch. FIG. 11 depicts a second exemplary embodiment of a switch which includes the second exemplary embodiment of the pressure response mechanism depicted in FIGS. 9-10. In the first exemplary embodiment and the second exemplary embodiment of the switch, the switch is configured to actuate a geophone device (70).

In the description of the first exemplary embodiments and the second exemplary embodiments which follows, features of the pressure response mechanism and the switch which are identical or equivalent in the two exemplary embodiments will be identified with the same reference numbers.

Referring to FIGS. 6-7, the first exemplary embodiment of a pressure response mechanism (100) comprises a switch cylinder (102), a switch piston (104), a first fluid isolation system (106), and a second fluid isolation system (108).

The first exemplary embodiment of the pressure response mechanism (100) as depicted in FIGS. 6-7 is located at a suitable position within an apparatus such as a drill string (24) which is insertable within a borehole, such as within a seismic-while-drilling (SWD) module, or at some other suitable position.

The pressure response mechanism (100) is interposed radially between an exterior (110) of the drill string (24) as an exterior space of the drill string (24) and a bore (34) of the drill string (24) as an interior space of the drill string (24). The pressure response mechanism (100) is exposed to a first pressure in the bore (34) of the drill string (24) and a second pressure at the exterior (110) of the drill string.

In the first exemplary embodiment of the pressure response mechanism (100), the switch cylinder (102) comprises an elongated longitudinally extending cavity defined in a component of the drill string (24). The switch piston (104) is contained within the switch cylinder (102) such that the switch piston (104) is reciprocable relative to the switch cylinder (102).

The switch cylinder (102) has a first switch cylinder end (120) and a second switch cylinder end (122). The switch piston (104) divides the switch cylinder into a first switch chamber (124) adjacent to the first switch cylinder end (120) and a second switch chamber (126) adjacent to the second switch cylinder end (122). A seal comprising a first seal element (130) adjacent to the first switch chamber (124) and a second seal element (132) adjacent to the second switch chamber (126) is mounted on the switch piston (104).

The first fluid isolation system (106) is located between the bore (34) of the drill string (24) and the first switch chamber (124). A purpose of the first fluid isolation system (106) is to isolate the pressure response mechanism (100) from fluids contained in the bore (34) of the drill string (24), while permitting the first pressure to be communicated from the bore (34) of the drill string (24) to the switch cylinder (102) so that the first switch chamber (124) is exposed to and in pressure communication with the first pressure.

The first fluid isolation system (106) comprises a first flexible fluid barrier (140), a first pressure transmission chamber (142), and a first pressure transmission fluid (144). The first flexible fluid barrier (140) is located between the bore (34) of the drill string (24) and the first switch chamber (124). The first pressure transmission chamber (142) is located between the first flexible fluid barrier (140) and the first switch chamber (124) and is in fluid communication with the first switch chamber (124). In the first exemplary embodiment of the pressure response mechanism (100), the first pressure transmission chamber (142) comprises a cavity defined by a component of the drill string (24). The first pressure transmission fluid (144) is contained within the first pressure transmission chamber (142) and the first switch chamber (124).

In the first exemplary embodiment of the pressure response mechanism (100), the first flexible fluid barrier (140) comprises an elastomer diaphragm which is covered and protected by a perforated cap (146). In the first exemplary embodiment of the pressure response mechanism (100), the first pressure transmission fluid (144) comprises a suitable oil.

The second fluid isolation system (108) is located between the exterior (110) of the drill string (24) and the second switch chamber (126). A purpose of the second fluid isolation system (106) is to isolate the pressure response mechanism (100) from fluids at the exterior (110) of the drill string (24), while permitting the second pressure to be communicated from the exterior (110) of the drill string (24) to the switch cylinder (102) so that the second switch chamber (126) is exposed to and in pressure communication with the second pressure.

The second fluid isolation system (106) comprises a second flexible fluid barrier (148), a second pressure transmission chamber (150), and a second pressure transmission fluid (152). The second flexible fluid barrier (148) is located between the exterior (110) of the drill string (24) and the second switch chamber (126). The second pressure transmission chamber (150) is located between the second flexible fluid barrier (148) and the second switch chamber (126) and is in fluid communication with the second switch chamber (126). In the first exemplary embodiment of the pressure response mechanism (100), the second pressure transmission chamber (150) comprises a cavity defined by a component of the drill string (24). The second pressure transmission fluid (152) is contained within the second pressure transmission chamber (150) and the second switch chamber (126).

In the first exemplary embodiment of the pressure response mechanism (100), the second flexible fluid barrier (148) comprises an elastomer diaphragm which is covered and protected by a perforated cap (154) secured by a retaining ring (156). In the first exemplary embodiment of the pressure response mechanism (100), the first pressure transmission fluid (144) comprises a suitable oil.

In the first exemplary embodiment of the pressure response mechanism (100), a biasing device (160) comprising a spring is contained within the second switch chamber (126), which urges the switch piston (104) toward the first switch cylinder end (120).

In the first exemplary embodiment of the pressure response mechanism (100), an access port (162) is provided between the exterior (110) of the drill string (24) and the first pressure transmission chamber (142), and a removable plug (164) is threadably mounted in the access port (162). The access port (162) and the plug (164) facilitate the introduction and retention respectively of the first pressure transmission fluid (144) into and within the first pressure transmission chamber (142).

In use, the pressure response mechanism (100) provides a pressure response in response to a pressure differential between the first pressure and the second pressure. In the first exemplary embodiment of the pressure response mechanism (100), the pressure response is represented by the position of the switch piston (104) within the switch chamber (102). If the pressure differential is below a lower pressure differential threshold, the switch piston (104) will be positioned within the switch cylinder (102) at a first pressure response position which is toward the first switch cylinder end (120). If the pressure differential is above an upper pressure differential threshold, the switch piston (104) will be positioned within the switch cylinder (102) at a second pressure response position which is toward the second switch cylinder end (122).

The biasing device (160) urges the switch piston (104) toward the first switch cylinder end (120). As a result, the pressure differential must overcome the force provided by the biasing device (160) in order to move the switch piston (104) to the second pressure response position.

Referring to FIG. 8, the first exemplary embodiment of a switch (170) comprises the first exemplary embodiment of the pressure response mechanism (100) and a device actuator (172). In the first exemplary embodiment of the switch (170), the switch (170) is configured to actuate a device in a drill string (24). More particularly, in the first exemplary embodiment of the switch (170), the switch (170) is configured to actuate a geophone device (70) comprising a geophone sensor (80), a geophone lock (82) and a borehole coupler (84). In the first embodiment of the switch (170), the borehole coupler (84) comprises three extendable and retractable coupling arms arranged around the circumference of the component of the drill string (24) which includes the geophone device (70).

In the first exemplary embodiment of the switch (170), the device actuator (172) comprises a first device actuator (174) for actuating the geophone lock (82) and a second device actuator (176) for actuating the borehole coupler (84). In other embodiments, a single device actuator may be provided for actuating both the geophone lock (82) and the borehole coupler (84).

In the first exemplary embodiment of the switch (170), both the first device actuator (174) and the second device actuator (176) are mechanical actuators.

In the first exemplary embodiment of the switch (170), the first device actuator (174) comprises a single member integrally formed with the switch piston (104), and the second device actuator (176) comprises three sets of a plurality of linked members interconnected between the switch piston (104) and each of the three coupling arms of the borehole coupler (84).

In the first exemplary embodiment of the switch (170), the switch cylinder (102) defines a first device actuator groove (178) for accommodating the first device actuator (174), and the switch cylinder defines three second device actuator grooves (180) for accommodating the three sets of linked members comprising the second device actuator (176).

In the first exemplary embodiment of the switch (170), the pressure response mechanism (100) is configured so that the first device actuator groove (178) and the second device actuator grooves (180) are maintained between the first seal element (130) and the second seal element (132) as the switch piston (104) reciprocates within the switch cylinder (102).

In the first exemplary embodiment of the switch (170), a second device actuator seal (190) is provided between the sets of members comprising the second device actuator (176) and the component of the drill string (24) in which the switch (170) is contained.

In the first exemplary embodiment of the switch (170), the first device actuator (174), the second device actuator (176) and the switch piston (104) are arranged to interact with the pressure response mechanism (100) and thus utilize the pressure differential between the first pressure and the second pressure, such that when the switch piston (104) is in the first pressure response position, the geophone device (70) is actuated to an operative state as depicted in FIGS. 2B and 3B, and such that when the switch piston (104) is in the second pressure response position, the geophone device (70) is actuated to a non-operative state as depicted in FIGS. 2A and 3A.

When the geophone device (70) is actuated to an operative state, the geophone lock (82) unlocks the geophone sensor (80) thereby mobilizing the geophone sensor (80), and the borehole coupler (84) is engaged with the borehole sidewall (52). When the geophone device (70) is actuated to a non-operative state, the geophone lock (82) locks the geophone sensor (80) thereby immobilizing the geophone sensor (80), and the borehole coupler (84) is disengaged from the borehole sidewall (52).

When the switch piston (104) is in the first pressure response position, the first device actuator (174) and the second device actuator (176) are both in a first actuator position. When the switch piston (104) is in the second pressure response position, the first device actuator (174) and the second device actuator (176) are both in a second actuator position.

The first device actuator (174) and the geophone sensor (80) are configured so that when the first device actuator (174) is in the first actuator position it restrains the geophone sensor and protects the geophone sensor (80) from vibration and shock, and are configured so that when the first device actuator (174) is in the second actuator position it releases the geophone sensor (80) and enables the geophone sensor (80) to sense seismic energy.

The second device actuator (176) is configured so that when the second device actuator (176) is in the first actuator position it is pivoted outward relative to the drill string (24)

and engages the borehole sidewall (52), and is configured so that when the second device actuator (176) is in the second actuator position it is pivoted inward relative to the drill string (24) away from the borehole sidewall (52) and is held adjacent to the drill string (24).

FIGS. 2A-2B and FIGS. 3A-3B depict geophone device (70) configurations which are different from the first exemplary embodiment of the switch (170). In the geophone device (70) configuration of FIGS. 2A-2B, the borehole coupler (84) extends and retracts without pivoting, so that a modified version of the second device actuator (not shown in FIGS. 2A-2B) may be required. In the geophone device (70) configuration of FIGS. 3A-3B, a single combined device is configured to function as both the borehole lock (82) and the borehole coupler (84), so that only a single device actuator (not shown in FIGS. 3A-3B) is required.

The second exemplary embodiment of a pressure response mechanism (100) is described with reference to FIGS. 9-10. The second exemplary embodiment of the switch (170) is described with reference to FIG. 11. In the second exemplary embodiment of the switch (170), the switch (170) is configured to actuate a geophone device (70).

The description of the second exemplary embodiment of the pressure response mechanism (100) and the second exemplary embodiment of the switch (170) is limited to the differences between the second exemplary embodiments and the first exemplary embodiments.

Referring to FIGS. 9-10, in the second exemplary embodiment of the pressure response mechanism (100), the switch cylinder (102) comprises an elongated radially extending cavity defined in a component of the drill string (24). The second exemplary embodiment of the pressure response mechanism (100) may therefore be advantageous for use in applications where there is limited space longitudinally within the drill string (24) to accommodate the pressure response mechanism (100), while the first exemplary embodiment of the pressure response mechanism (100) may be advantageous for use in applications where there is limited space radially within the drill string (24) to accommodate the pressure response mechanism (100).

Referring to FIGS. 9-10, in the second exemplary embodiment of the pressure response mechanism (100), the access port (162) and the plug (164) of the first exemplary embodiment may be omitted, since the first pressure transmission fluid (144) can be introduced into the first pressure transmission chamber (142) via the second pressure transmission chamber (150) and the switch cylinder (102).

Referring to FIG. 11, in the second exemplary embodiment of the switch (170), the borehole coupler (84) extends and retracts without pivoting, so that the second device actuator (176) is modified in order to accommodate the movement of the borehole coupler (84).

Referring to FIG. 5, embodiments of a pressure response mechanism (100) and a switch (170) similar to the first exemplary embodiments and the second exemplary embodiments may be used to actuate a sampling device (90) between an operative state in which a sampling tube (92) extends from the drill string (24) and engages the borehole sidewall (52) in order to collect a sample (not shown) and a non-operative state in which the sampling tube (92) is disengaged from the borehole sidewall (52) and is retracted away from the borehole sidewall (52) in order to protect the sampling tube (92). In embodiments which are used to actuate a sampling device (90), the sampling tube (92) may, as a non-limiting example, be actuated by a device actuator (172) comprising a mechanical linkage similar to the second device actuator (176) in the first and second exemplary embodiments of the switch (170).

A method for actuating a device utilizing a pressure differential may be performed by using the switch (170) described above, or by using some other structure, device or apparatus or some combination of other structures, devices and/or apparatus.

In use of the switch (170) described above, a method for actuating a device may be performed by providing a pressure response mechanism (100) and a device actuator (172), by providing a first pressure differential which is below a lower pressure differential threshold in order to actuate the device to an operative state, and/or by providing a second pressure differential which is above an upper pressure differential threshold in order to actuate the device to a non-operative state.

In some embodiments, the method may be performed in an apparatus which is insertable in a borehole (26). In some embodiments, the method may be performed in an apparatus which is used to drill a borehole (26). In some embodiments, the method may be performed in an apparatus comprising a drill string (24).

Referring to FIG. 1, FIGS. 2A-2B and FIGS. 3A-3B, in some particular embodiments, the drill string (24) may comprise a bore (34) and an exterior (110) and the pressure differential may be the difference between a first pressure in the bore (34) of the drill string (24) and a second pressure at the exterior (110) of the drill string (24).

Referring to FIG. 1, FIG. 2A and FIG. 3A, during drilling of the borehole (26), drilling fluid (58) may circulate downward from the ground surface (76) within the drill string (24) through the bore (34), may exit the drill string (24) at the drill bit (40), and may circulate upward through the borehole annulus (56) at the exterior (110) of the drill string (24). During drilling, the first pressure in the bore (34) will typically be significantly higher than the second pressure at the exterior (110) of the drill string (24), thus providing a pressure differential between the first pressure and the second pressure. The pressure differential during drilling is typically due to energy losses experienced by the drilling fluid (58) as it circulates, particularly when the drilling fluid (58) exits the drill string (24) at the drill bit (40). These energy losses may be dependent upon many factors including, as non-limiting examples, drill bit nozzle area, flow rate of the drilling fluid (58) through the drill string (24), density of the drilling fluid (58), configuration of the drill string (24), etc. As an exemplary non-limiting range, the pressure differential during drilling may be in the range of between about 500 psi (about 3450 kPa) and about 4000 psi (27,600 kPa).

Referring to FIG. 1, FIG. 2B and FIG. 3B, when circulation of the drilling fluid (58) through the drill string (24) stops, typically when drilling stops, the pressure differential between the first pressure in the bore (34) of the drill string (24) and the exterior (110) of the drill string (24) will typically decrease significantly. As an exemplary non-limiting example, the pressure differential when drilling fluid (58) is not circulating through the drill string (24) may be about 10 psi (about 69 kPa).

The significant difference between the typical pressure differential during circulation of drilling fluid (58) and during non-circulation of drilling fluid (58) may facilitate the establishment of a lower pressure differential threshold and an upper pressure differential threshold. If the pressure differential is below the lower pressure differential threshold, the method (and/or a switch (170) performing the method) may be configured to actuate the device to a desired state. If the pressure differential is above the upper pressure differential threshold, the method (and/or a switch (170) performing the method) may be configured to actuate the device to a different desired state.

As a non-limiting example using the exemplary pressure differential values described above, the lower pressure differential threshold may be selected to be about 100 psi (about 700 kPa) and the upper pressure differential threshold may be selected to be about 400 psi (about 2800 kPa).

If the device is a device which is typically used while drilling is ongoing, the method (and/or the switch (170) performing the method) may be configured to actuate the device to an operative state when the pressure differential is above the upper pressure differential threshold. If the device is a device which is typically used while drilling is stopped, the method (and/or the switch (170) performing the method) may be configured to actuate the device to an operative state when the pressure differential is below the lower pressure differential threshold.

As non-limiting examples, if the device is a geophone device (70) or a sampling device (90), the method (and/or the switch performing the method) may be configured to actuate the device to an operative state when the pressure differential is below the lower pressure differential threshold, and may be configured to actuate the device to a non-operative state when the pressure differential is above the upper pressure differential threshold.

ADDITIONAL DISCLOSURES

The following are non-limiting, specific embodiments of the switch and the method:

Embodiment A. In an apparatus exposed to a first pressure and a second pressure, a switch responsive to a pressure differential, wherein the pressure differential is equal to the first pressure minus the second pressure, the switch comprising:
  (a) a pressure response mechanism for providing a pressure response in response to the pressure differential; and
  (b) a device actuator arranged to interact with the pressure response mechanism and to utilize the pressure response of the pressure response mechanism to actuate a device, wherein the device actuator actuates the device to an operative state when the pressure differential is below a lower pressure differential threshold.

Embodiment B. The switch of Embodiment A wherein the device actuator actuates the device to a non-operative state when the pressure differential is above an upper pressure differential threshold.

Embodiment C. The switch of any one of Embodiments A or B wherein the pressure response mechanism is in a first pressure response position when the pressure differential is below the lower pressure differential threshold, and wherein the pressure response mechanism is in a second pressure response position when the pressure differential is above the upper pressure differential threshold.

Embodiment D. The switch of any one of Embodiments A through C, further comprising a biasing device for urging the pressure response mechanism toward a first pressure response position.

Embodiment E. The switch of any one of Embodiments A through D wherein the pressure response mechanism comprises:
  (a) a switch cylinder having a first switch cylinder end and a second switch cylinder end;
  (b) a switch piston contained within the switch cylinder such that the switch piston and the switch cylinder are reciprocable relative to each other, wherein the switch piston divides the switch cylinder into a first switch chamber adjacent to the first switch cylinder end and a second switch chamber adjacent to the second switch cylinder end;
  (c) wherein the first switch chamber is in pressure communication with the first pressure; and
  (d) wherein the second switch chamber is in pressure communication with the second pressure.

Embodiment F. The switch of any one of Embodiments A through E wherein the first pressure is a pressure in an interior space defined by the apparatus and/or wherein the second pressure is a pressure at an exterior of the apparatus.

Embodiment G. The switch of any one of Embodiments E or F, further comprising a first fluid isolation system between the interior space of the apparatus and the first switch chamber for isolating the first switch chamber from an interior space fluid, and/or further comprising a second fluid isolation system between the exterior of the apparatus and the second switch chamber for isolating the second switch chamber from an exterior fluid.

Embodiment H. The switch of any one of Embodiments E through G:
  (a) wherein the first fluid isolation system comprises a first flexible fluid barrier between the interior space and the first switch chamber and a first pressure transmission chamber between the first flexible fluid barrier and the first switch chamber; and/or
  (b) wherein the second fluid isolation system comprises a second flexible fluid barrier between the exterior of the apparatus and the second switch chamber and a second pressure transmission chamber between the second flexible fluid barrier and the second switch chamber.

Embodiment I. The switch of any one of Embodiments E through H wherein the first fluid isolation system further comprises a first pressure transmission fluid contained within the first pressure transmission chamber and the first switch chamber and/or wherein the second fluid isolation system further comprises a second pressure transmission fluid contained within the second pressure transmission chamber and the second switch chamber.

Embodiment J. The switch of any one of Embodiments E through I wherein the first flexible fluid barrier comprises a diaphragm, and/or wherein the second flexible fluid barrier comprises a diaphragm.

Embodiment K. The switch of any one of Embodiments E through J, further comprising a seal between the switch piston and the switch cylinder, for inhibiting fluids from passing between the first switch chamber and the second switch chamber.

Embodiment L. The switch of any one of Embodiments A through K wherein the apparatus defines a bore extending through an interior of the apparatus, wherein the first pressure is a pressure in the bore of the apparatus, and/or wherein the second pressure is a pressure at an exterior of the apparatus.

Embodiment M. The switch of any one of Embodiments A through L wherein the apparatus is insertable in a borehole.

Embodiment N. The switch of any one of Embodiments A through M, further comprising the device, wherein the device is selected from a group of devices consisting of a geophone device and a sampling device.

Embodiment O. The switch of any one of Embodiments A through N wherein the device is a geophone device comprising a geophone sensor, a geophone lock associated with the geophone sensor, and a borehole coupler, and wherein the device actuator comprises a first device actuator for actuating the geophone lock and a second device actuator for actuating the borehole coupler.

Embodiment P. The switch of any one of Embodiments A through O wherein the device is a sampling device and wherein the device actuator comprises a mechanical coupling connected with the pressure response mechanism.

Embodiment Q. A method for actuating a device, comprising:
(a) providing a pressure response mechanism which provides a pressure response in response to a pressure differential, wherein the pressure differential is equal to a first pressure minus a second pressure;
(b) providing a device actuator which is arranged to interact with the pressure response mechanism to utilize the pressure response of the pressure response mechanism to actuate the device; and
(c) providing a first pressure differential, wherein the first pressure differential is below a lower pressure differential threshold, in order to actuate the device to an operative state.

Embodiment R. The method of Embodiment Q, further comprising providing a second pressure differential, wherein the second pressure differential is above an upper pressure differential threshold, in order to actuate the device to a non-operative state.

Embodiment S. The method of any one of Embodiments Q or R wherein the device is a component of an apparatus which is configured to be located in a borehole.

Embodiment T. The method of any one of Embodiments Q through S wherein the apparatus comprises a bore extending through an interior of the apparatus, wherein the first pressure is a pressure in the bore of the apparatus, and/or wherein the second pressure is a pressure at an exterior of the apparatus.

Embodiment U. The method of any one of Embodiments Q through T wherein the device is a device selected from a group of devices consisting of a geophone device and a sampling device.

Additional embodiments which result from combining, integrating and/or omitting features of the embodiments explicitly described herein are not intended to be precluded.

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. In an apparatus exposed to a first pressure and a second pressure, a switch responsive to a pressure differential, wherein the pressure differential is equal to the first pressure minus the second pressure, the switch comprising:
(a) a pressure response mechanism for providing a pressure response in response to the pressure differential, wherein the pressure response mechanism comprises:
(i) a switch cylinder having a first switch cylinder end and a second switch cylinder end;
(ii) a switch piston contained within the switch cylinder such that the switch piston and the switch cylinder are reciprocable relative to each other, wherein the switch piston divides the switch cylinder into a first switch chamber adjacent to the first switch cylinder end and a second switch chamber adjacent to the second switch cylinder end;
(iii) wherein the first switch chamber is in pressure communication with the first pressure; and
(iv) wherein the second switch chamber is in pressure communication with the second pressure;
(b) a device actuator arranged to interact with the pressure response mechanism and to utilize the pressure response of the pressure response mechanism to actuate a device, wherein the device actuator actuates the device to an operative state when the pressure differential is below a lower pressure differential threshold;
(c) a first fluid isolation system for isolating the first switch chamber from a first fluid; and
(d) a second fluid isolation system for isolating the second switch chamber from a second fluid.

2. The switch as claimed in claim 1 wherein the device actuator actuates the device to a non-operative state when the pressure differential is above an upper pressure differential threshold.

3. The switch as claimed in claim 2 wherein the pressure response mechanism is in a first pressure response position when the pressure differential is below the lower pressure differential threshold, and wherein the pressure response mechanism is in a second pressure response position when the pressure differential is above the upper pressure differential threshold.

4. The switch as claimed in claim 3, further comprising a biasing device for urging the pressure response mechanism toward the first pressure response position.

5. The switch as claimed in claim 4 wherein the first pressure is a pressure in an interior space defined by the apparatus and wherein the second pressure is a pressure at an exterior of the apparatus.

6. The switch as claimed in claim 5, wherein the first fluid isolation system is between the interior space of the apparatus and the first switch chamber and isolates the first switch chamber from an interior space fluid, and wherein the second fluid isolation system is between the exterior of the apparatus and the second switch chamber and isolates the second switch chamber from an exterior fluid.

7. The switch as claimed in claim 6:
(a) wherein the first fluid isolation system comprises a first flexible fluid barrier between the interior space and the first switch chamber and a first pressure transmission chamber between the first flexible fluid barrier and the first switch chamber; and
(b) wherein the second fluid isolation system comprises a second flexible fluid barrier between the exterior of the apparatus and the second switch chamber and a second pressure transmission chamber between the second flexible fluid barrier and the second switch chamber.

8. The switch as claimed in claim 7 wherein the first fluid isolation system further comprises a first pressure transmission fluid contained within the first pressure transmission chamber and the first switch chamber and wherein the second fluid isolation system further comprises a second pressure transmission fluid contained within the second pressure transmission chamber and the second switch chamber.

9. The switch as claimed in claim 8 wherein the first flexible fluid barrier comprises a diaphragm, and wherein the second flexible fluid barrier comprises a diaphragm.

10. The switch as claimed in claim 7, further comprising a seal between the switch piston and the switch cylinder, for inhibiting fluids from passing between the first switch chamber and the second switch chamber.

11. The switch as claimed in claim 1 wherein the apparatus defines a bore extending through an interior of the apparatus, wherein the first pressure is a pressure in the bore of the apparatus, and wherein the second pressure is a pressure at an exterior of the apparatus.

12. The switch as claimed in claim 11 wherein the apparatus is insertable in a borehole.

13. The switch as claimed in claim 12, further comprising the device, wherein the device is selected from a group of devices consisting of a geophone device and a sampling device.

14. The switch as claimed in claim 13 wherein the device is a geophone device comprising a geophone sensor, a geophone lock associated with the geophone sensor, and a borehole coupler, and wherein the device actuator comprises a first device actuator for actuating the geophone lock and a second device actuator for actuating the borehole coupler.

15. The switch as claimed in claim 13 wherein the device is a sampling device and wherein the device actuator comprises a mechanical coupling connected with the pressure response mechanism.

16. A method for actuating a device, comprising:
 (a) providing a switch comprising:
  (i) a pressure response mechanism which provides a pressure response in response to a pressure differential, wherein the pressure differential is equal to a first pressure minus a second pressure, and wherein the pressure response mechanism comprises:
   (A) a switch cylinder having a first switch cylinder end and a second switch cylinder end;
   (B) a switch piston contained within the switch cylinder such that the switch piston and the switch cylinder are reciprocable relative to each other, wherein the switch piston divides the switch cylinder into a first switch chamber adjacent to the first switch cylinder end and a second switch chamber adjacent to the second switch cylinder end;
   (C) wherein the first switch chamber is in pressure communication with the first pressure; and
   (D) wherein the second switch chamber is in pressure communication with the second pressure;
  (ii) a device actuator which is arranged to interact with the pressure response mechanism to utilize the pressure response of the pressure response mechanism to actuate the device;
  (iii) a first fluid isolation system for isolating the first switch chamber from a first fluid; and
  (iv) a second fluid isolation system for isolating the second switch chamber from a second fluid; and
 (b) providing a first pressure differential, wherein the first pressure differential is below a lower pressure differential threshold, in order to actuate the device to an operative state.

17. The method as claimed in claim 16, further comprising providing a second pressure differential, wherein the second pressure differential is above an upper pressure differential threshold, in order to actuate the device to a non-operative state.

18. The method as claimed in claim 17 wherein the device is a component of an apparatus which is configured to be located in a borehole, wherein the apparatus comprises a bore extending through an interior of the apparatus, wherein the first pressure is a pressure in the bore of the apparatus, and wherein the second pressure is a pressure at an exterior of the apparatus.

19. The method as claimed in claim 18 wherein the device is a device selected from a group of devices consisting of a geophone device and a sampling device.

* * * * *